United States Patent [19]
Lefeuvre

[11] 3,886,374
[45] May 27, 1975

[54] LOCKABLE SLIDE FITTING FOR A SAFETY BELT SYSTEM

[75] Inventor: Andre Lefeuvre, Noisy-le-Roi, France

[73] Assignees: Regie Nationale des Usines Renault; Automobiles Peugeot, both of Paris, France

[22] Filed: Sept. 7, 1973

[21] Appl. No.: 395,158

[30] Foreign Application Priority Data
Feb. 14, 1973 France .............................. 73.05211
Oct. 5, 1972 France .............................. 72.35394

[52] U.S. Cl. ...... 307/10 SB; 200/61.58 B; 267/156; 180/82 C
[51] Int. Cl. .......................................... H01h 35/00
[58] Field of Search ... 180/82 C; 307/10 LS, 10 SB; 200/61.58 B; 280/150 SB; 188/1 R

[56] References Cited
UNITED STATES PATENTS

| | | | |
|---|---|---|---|
| 2,959,251 | 11/1960 | Landman et al. | 188/1 R |
| 3,289,792 | 12/1966 | Moberg | 280/150 SB |
| 3,348,881 | 10/1967 | Weman | 280/150 SB |
| 3,535,001 | 10/1970 | Lewis et al. | 280/150 SB |
| 3,610,361 | 10/1971 | Pringle | 280/150 SB |
| 3,713,506 | 1/1973 | Lipschutz | 180/82 C |

*Primary Examiner*—Robert K. Schaffer
*Assistant Examiner*—M. Ginsburg
*Attorney, Agent, or Firm*—Stevens, Davis, Miller & Mosher

[57] ABSTRACT

A slide fitting for a safety belt, comprising a cross bar movable between a belt locking and a belt releasing position and an electromagnetic coil and armature combination formed on a hinged arm to effect sliding movement of the cross bar, by means of at least one link connected between the arm and the frame, the armature being carried by the arm and the coil by the frame. Switch means enable the cross bar to be moved to its first belt locking position by energizing of the coil when desired.

8 Claims, 8 Drawing Figures

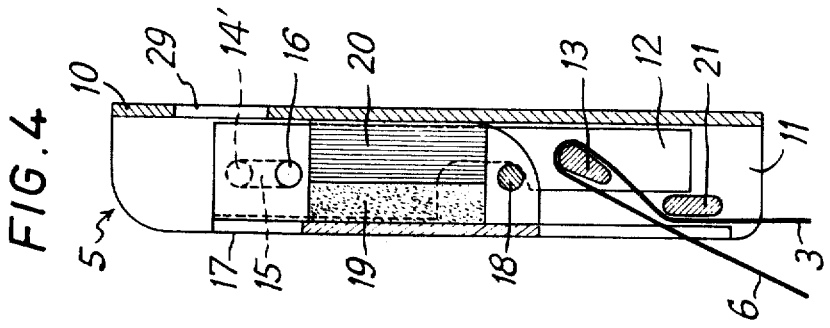
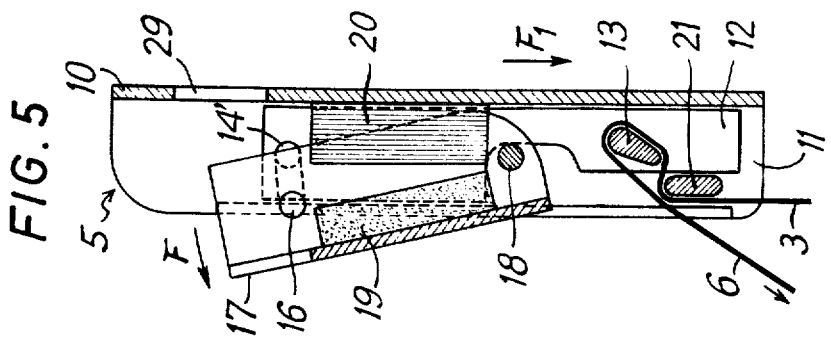
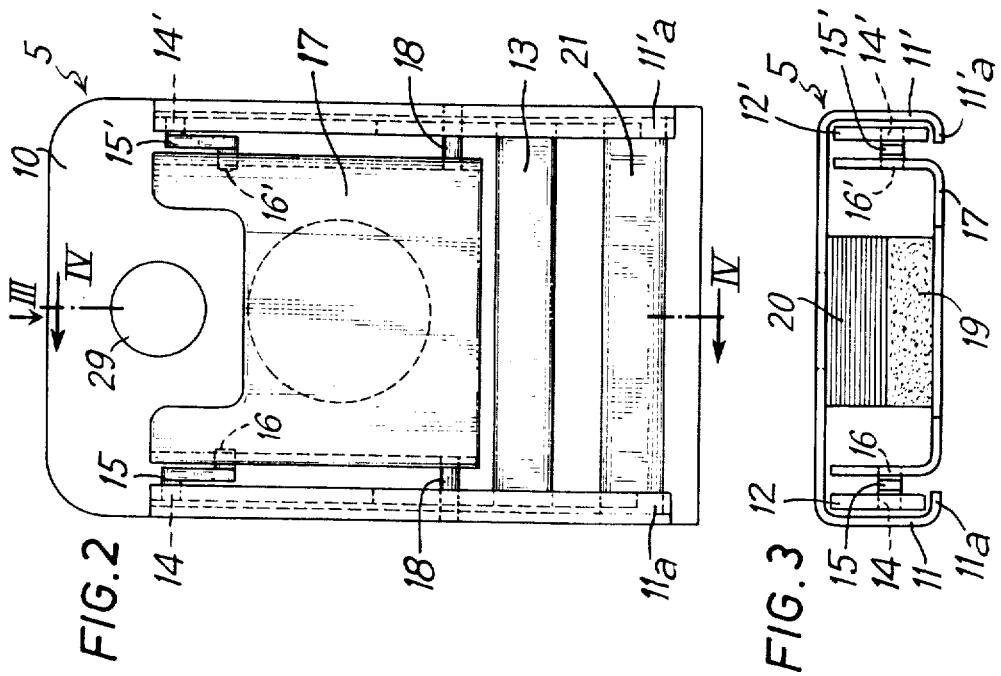

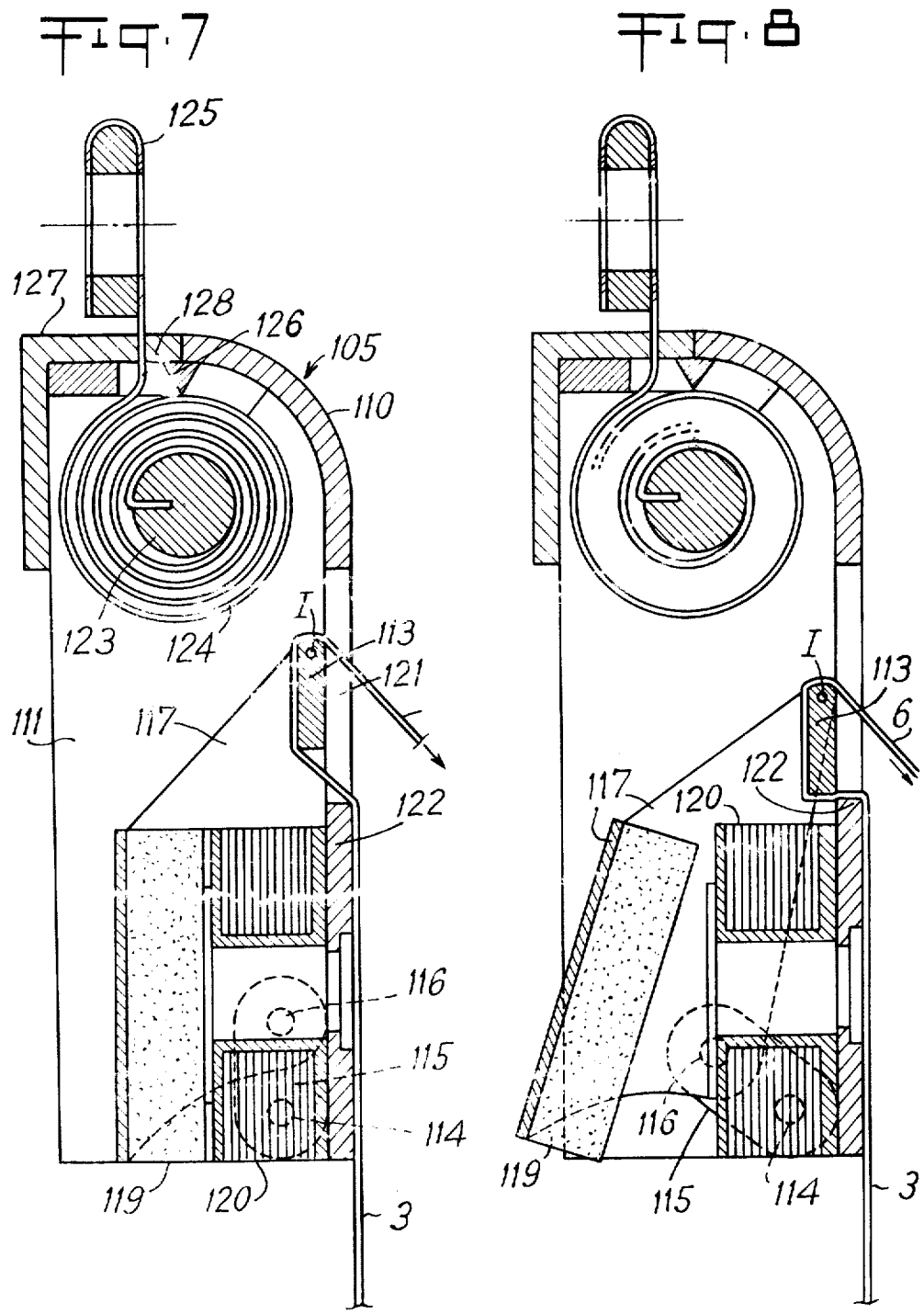

LOCKABLE SLIDE FITTING FOR A SAFETY BELT SYSTEM

The present invention relates to a slide fitting with a locking device for a safety belt.

It is known, especially in automobiles, to use safety belts with a reel device such belt systems having three points of attachment, namely a shoulder strap coming from the said reel device and extending diagonally relative to the chest of the user, a lap strap which extends substantially transversely and is fixed on either side of the user in the vicinity of the floor and in which the shoulder strap is extensible in that it passes through a slide fitting.

In order to prevent paying out of the belt in the case of an accident, it is usual to equip these safety belt systems with means for locking the sliding of the strap. The locking means are generally integrated into the reel device and complicate the construction of the said device to a greater or lesser extent. In order to overcome this disadvantage, it has been desired to separate the locking means from the reel device. A manual locking device has been developed which also makes it possible temporarily to remove the pull of the wind-up spring of the reel without it being necessary to lock the reel core. In this way, more comfortable control is achieved by removing the pull exterted on the shoulder strap by the reel device.

It is advantageous for the strap to be locked automatically when the occupant of the seat transmits a violent force to the belt, especially during sudden slowing down of the vehicle, either avoiding an obstacle or after a collison. In this case, the belt system behaves as one in which the various straps are connected rigidly at all three points of attachment of the belt.

The safety belt system with which the present invention is concerned is of the "lap and diagonal" type having three points of attachment, with a fixed reel device for one end of a shoulder strap which slides through a fixed slide fitting before passing diagonally across the chest of the vehicle occupant to be anchored by its other end in the vicinity of the floor. A lap strap passes transversely in front of the occupant and is fixed on either side of the occupant in the vicinity of the floor.

According to the present invention there is provided a lockable slide fitting for use in a vehicle safety belt system of the lap and diagonal type having three points of attachment and comprising a fixed reel device for one end of a shoulder strap which strap may slide through the lockable slide fitting before passing diagonally across the chest of the vehicle occupant to be anchored by its other end in the vicinity of the floor, the said lockable slide fitting comprising a frame, means for attaching the frame to a component of the body of the vehicle, a cross bar slidably mounted in the frame for movement between a first belt locking position and a second belt releasing position, and over which the strap may pass, an arm hinged to the frame of the fitting, at least one rod connecting said cross bar to said arm, an armature of ferro-magnetic material, a coil carried fixedly by said frame and co-operating with the armature, and means for connecting said coil to an electric circuit to energize the coil.

The coil can be supplied with electric current in such a way as to act on the armature on the hinged arm and thus to make it possible for the cross bar to move into the belt locking position.

According to a preferred embodiment the armature is a permanent magnet which is capable of placing the hinged arm in a position where the movable cross bar is in its belt releasing position when the electro-magnet is de-energized.

In order that the present invention may more readily be understood, the following description is given merely by way of example, with reference to the attached drawings in which:

FIG. 2 is a front view of a slide fitting according to the invention, in the free sliding position;

FIG. 3 is a plan view of the same fitting, viewed in the direction of line III of FIG. 2;

FIG. 4 is a cross-sectional view of the fitting along the line IV—IV of FIG. 2;

FIG. 5 is a view corresponding to that of FIG. 4 but showing the same fitting in the position in which the strap is locked;

FIG. 7 is a view in longitudinal section of another embodiment of the fitting; and FIG. 8 is the same sectional view of the fitting of FIG. 7 in the position where the strap is locked.

Figure 1:
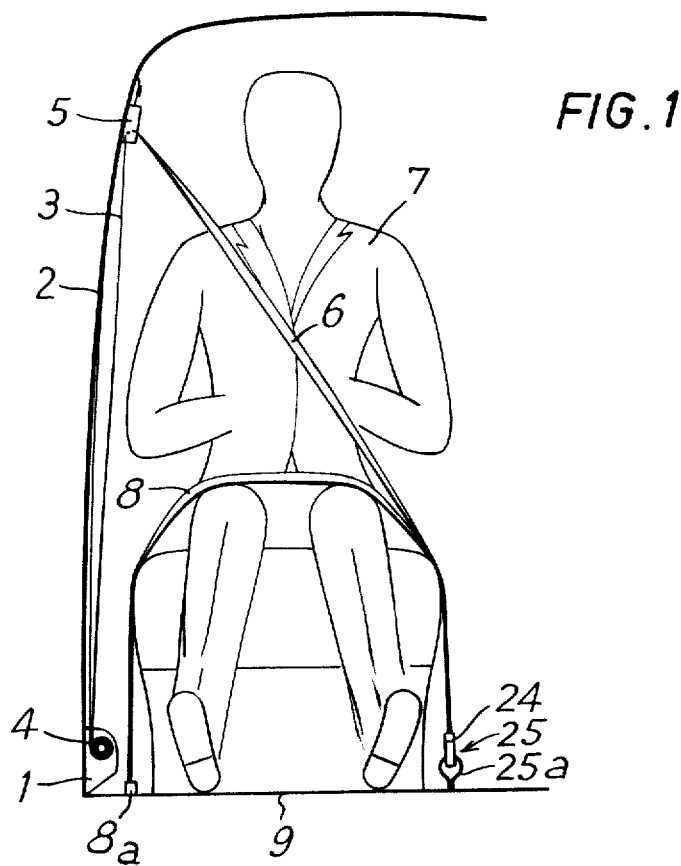
FIG. 1 is a schematic view showing a passenger restrained by means of a safety belt system embodying the features of the invention.

FIG. 1 shows a safety belt comprising a strap 3, the end of which is wound on a core 4 of the reel device 1 fixed to the lower part of one of the side or door pillars 2 of an automobile, in such a way that the strap 3 can be pulled upwards from the reel device. The core 4 is mounted on a spindle provided in a known manner, with a return spring (not shown) the resistance of which spring must be overcome in order to pull the strap 3.

From the core 4, the strap 3 passes through a slide fitting 5, which is the subject of the invention, and which is attached to the upper part of the side or door pillar 2 or to the longitudinal member situated at the base of the roof. After passing through the fitting 5, the strap 3 acts as a diagonal shoulder strap 6 and passes in front of the chest of the passenger represented schematically at 7.

The belt also comprises a lap strap 8 which passes transversely in front of the passenger and which is fixed on either side of the passenger in the vicinity of the floor 9.

The lap strap 8 is firmly fixed to the floor 9 by an anchoring device 8a and is connected to the diagonal shoulder strap 6 by the component 24 of a belt attachment buckle 25 held in a floor clasp 25a.

The slide fitting 5 has been shown in greater detail in FIGS. 2 to 5 and comprises a plate metal frame 10 of U-shaped cross-section, the side portions 11 and 11' of which have bent over edges 11a and 11'a and form grooves for guiding two arms 12 and 12' of a slide-bar. The arms 12, and 12' of the slide-bar are connected at one of their ends by a mobile cross-piece 13 over which is fitted a loop formed by the strap 3 of the belt. At the other end of each of the arms 12, 12' of the slide-bar is a pair of rods 15, 15' about a first pair of axles 14, 14' and carrying a second pair of axles 16, 16' hingedly connecting it to an arm 17 which is itself hinged along a spindle 18 to the plate metal frame 10.

Figure 6:
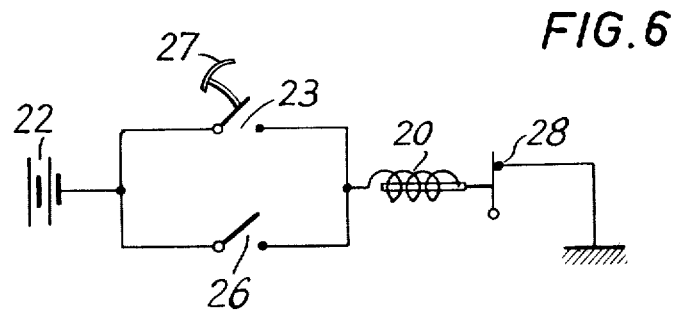
FIG. 6 is a simplified diagram of an embodiment of the circuit which supplies the solenoid which controls the locking components.

An operating solenoid shown in FIGS. 5 and 6 includes a permanent magnet armature 19 of magnetized magnetic material firmly attached to the arm 17 and a coil 20 mounted on the frame 10. The armature 19 is repelled by the solenoid coil 20 when an electric current passes through the coil. At one of the ends of the frame 10 situated near the mobile cross-piece 13, there is attached a fixed cross-bar 21 which co-operates with the mobile cross-piece 13 to lock the strap 3 when the arms 12, 12' move downwardly as viewed in FIGS. 4 and 5.

The frame 10 has a hole 29 which enables it to be attached to a part of the car-body by means of a bolt or other fixing means.

As shown in FIG. 6, the coil 20 of the solenoid is mounted in an electric circuit comprising a current source 22, a switch 23 controlled by the automobile brake pedal 27 and an inertia switch 26, these switches 23 and 26 being connected as a parallel pair in the supply conductor to the coil 20. The entire circuit is moreover protected against any accidental voltage surge by a thermal release mechanism 28 which can be reset manually or automatically after a preset time.

The safety device of the present invention functions in the followng way:

The passenger grips the safety belt buckle 25 which, in the retracted position of the belt is in the vicinity of the slide fitting 5, and pulls the buckle across his or her body against a spring biasing effect of the reel device 1. The passenger then fastens the safety belt by fixing the buckle 25 into the floor mounted attachment clasp 25a, firmly fixed to the floor 9 of the vehicle. During this movement the reel device is in the configuration shown in FIG. 4 and allows the strap 6 to slide freely between the mobile cross-piece 13 and the fixed cross-bar 21. Once the buckle is anchored in the clasp 25a, the safety belt remains taut under the action of the return spring of the reel device 1 which maintains a given pull on the strap 3.

The slide fitting 5, in this position has the solenoid armature 19 held in contact with the coil 20 which is not energized, the arms 12, 12' being in their raised position such that the strap 3 can slide between the mobile crosspiece 13 and the fixed cross-bar 21.

When the driver of the vehicle presses the brake pedal 27 closing the switch 23, or when the vehicle undergoes sudden deceleration closing the inertia switch 26, current is supplied to the coil 20 from the current source 22. Since the coil 20 is connected into the circuit in such a way that it repels the armature 19 into the FIG. 5 position, the arm 17 is caused to pivot about its spindle 18, in the direction of the arrow F, as the switch 23 or 26 closes. The arm 17 acts via the links 15 and 15' on the arms 12, 12' which is shifted in the direction of the arrow $F_1$, causing the mobile cross-piece 13 to lock the strap 3, 6 against the fixed crossbar 21 (FIG. 5).

In the embodiment described above, the arm 17 carries an armature made of magnetic material which co-operates with a coil firmly fixed to the frame of the fitting.

The purpose of the alternative embodiment represented in FIGS. 7 and 8 is to make the construction of such a fitting simpler in that the mobile cross-piece 113, over which the strap 3 is fitted, is secured to the arm 117 which carries the magnetic armature 119, the arm 117 being connected by at least link 115 to the frame of the fitting.

In this embodiment the movable cross-piece 113 is longer than the width of an opening 121 in the frame. In this way the movable cross-piece 113 may slide up and down the frame 110 without being pulled through the opening 121 by the effect of the pull on the belt run 6.

As shown in FIGS. 7 and 8, the slide fitting 105 comprises a plate metal frame 110 of U-shaped cross-section and having side portions 111 which extend laterally and carry, hinged about a first set of spindles 114, a set of two links 115 to which an arm 117 is hinged about a second set of spindles 116.

The arm 117 is provided with the mobile cross-piece 113 over which passes a loop formed by the strap 6 of the belt, the said loop passing through the opening 121 provided in the frame 110. The cross-piece 113 is advantageously hinged to an axle I firmly attached to the arm 117.

A solenoid coil 120 mounted on the frame 110 co-operates with the armature 119 of magnetized magnetic material, which is secured to the arm 117, the armature being repelled by the magnetic field set up in the coil 120 when an electric current flows.

When the armature 119 is repelled by the magnetic field in the coil 120, the arm 117 pivots relative to the frame 110, by means of the links 115 in the position represented in FIG. 8.

As a result of this, the cross-piece 113 moves down to cause the strap in contact with the lower edge 122 of the opening 121 to be locked in position.

The fitting 105 also comprises an energy absorber incorporated into the frame 110. For this purpose, the side portions 111 of the frame 110 surround the ends of an axle 123 on which is wound a clockspring 124 the free end of which is firmly fixed to a plate 125 having an orifice for receiving an attaching screw to attach it to the body of the vehicle. It should be noted, however, that the axle 123 is not connected to the frame of the fitting but is instead freely received between the side walls 111. The upper wall of the frame 110 acts as a mounting for a knife 126 of triangular cross-section, the cutting-edge of which points towards the axle 123.

When the fitting 105 is being installed, the clock spring 124 is first passed through an orifice 128 in the knife 126 and the frame 110 is then closed by a cover 127 provided with a slit for the passage for the strip of the spring steel of the spring 124. The plate 125 will be attached to the spring 124 after the cover 127 has been put in place.

It can be seen that a sufficiently large pull applied to the strap 6 will cause the spring steel to be drawn through the slit in the cover 127 causing the knife 126 to engage the spring and to exert a cutting or scraping action on the spring steel resisting its further movement through the cover 127. Although an extremely strong pull might possibly sever the clockspring altogether, the device will be designed so that this pull exceeds the expected maximum force to which the fitting will be subjected in an accident.

Clearly, once the spring 124 has been withdrawn through the slit in an accident it will be necessary to have the entire safety belt system checked for overstraining and a new spring 124 to be fitted.

The armature 19, or 119 may be a permanent magnet as described above or alternatively it may be a ferromagnetic core which is attached by the solenoid core 20 against suitable spring biasing.

We claim:

1. A lockable slide fitting for use in a vehicle safety belt system of the "lap and diagonal" type having three points of attachment and comprising a fixed reel device for one end of a shoulder strap which strap may slide through the lockable slide fitting before passing diagonally across the chest of the vehicle occupant to be anchored by its other end in the vicinity of the floor, the said lockable slide fitting comprising a frame, means for attaching the frame to a component of the body of the vehicle, means including a movable cross bar slidably mounted in the frame for movement between a first position in which the strap is locked and a second position and over which the strap may pass, an arm hinged to the frame of the fitting, at least one rod connecting said cross bar to said arm, an armature of ferromagnetic material supported by said arm, a coil carried fixedly by said frame and co-operating with the armature, and means for connecting said coil to an electric circuit to energize the coil.

2. A slide fitting according to claim 1, and said second mentioned means includes a fixed cross bar firmly attached to the frame of the fitting to co-operate with the movable cross bar such that the strap is locked between the movable cross bar and the fixed cross bar when said movable cross bar is in its first position.

3. A slide fitting according to claim 1, and including an energy absorbing device connected between said fitting and said means for attaching the frame to a vehicle.

4. A slide fitting according to claim 3, wherein said energy absorbing device comprises a clock spring having a radially inner end located within said frame and a tangentially extending end connected to said attaching means, means defining a slit in said frame through which said tangentially extending end passes, an axle secured to said radially inner end and loosely received within said frame, and a knife to engage said spring as said tangentially extending end is drawn through said slit in the frame.

5. A slide fitting of claim 1 in combination with means, including: the safety belt with a shoulder strap and the lap strap, a reel device connected to one end of said shoulder strap and the slide fitting secured to a side wall of the vehicle with said shoulder strap slidably extending therethrough, and an electric circuit connected to said slide fitting, said circuit including a source of current and switch means for energizing said coil to repel said armature.

6. A slide fitting, safety belt, and reel device combination according to claim 5, wherein said switch means comprise an inertia switch.

7. A slide fitting, safety belt, and reel device combination according to claim 5, wherein said switch means comprise a switch connected to a vehicle brake pedal to be closed when said pedal is operated.

8. A fitting for a vehicle safety belt system comprising a frame for locking engagement with a safety belt, and energy absorbing means consisting of a clock spring having a radially inner end located with said frame and a tangentially extending end located outside said frame, means on said frame defining a slit to receive said tangentially extending end for sliding movement therethrough, an axle fastened to said radially inner end of the spring and received loosely in said frame, means secured to the tangentially extending end for attaching to a vehicle body, and knife means on said frame for engaging said clock spring as said tangentially extending end is pulled through said slit.

* * * * *